Patented Oct. 4, 1932

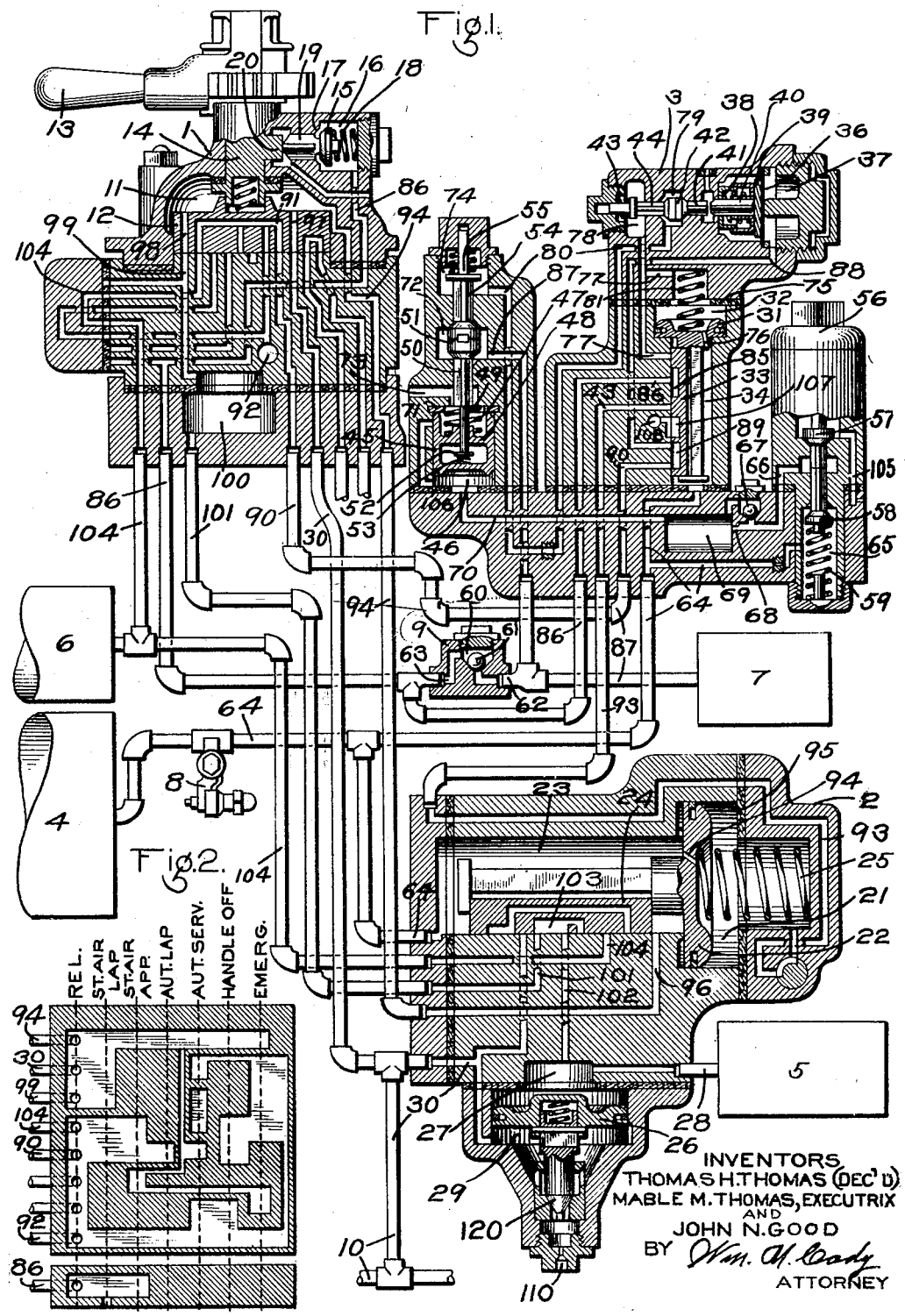

1,881,148

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, AND JOHN N. GOOD, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA

TRAIN CONTROL DEVICE

Application filed August 7, 1929. Serial No. 384,074.

This invention relates to automatic train control apparatus adapted to control railway trains in accordance with the traffic conditions.

In the usual train control apparatus such as disclosed in the pending patent application of Earle S. Cook and Lloyd V. Lewis, Serial No. 363,010, filed May 14, 1929, means are disclosed by which an operator may prevent a train control application of the brakes from being effected by manually effecting an application of the brakes in the usual manner, and after an application is thus effected means are provided to maintain the train control apparatus inoperative.

The principal object of this invention is to provide a simplified train control apparatus to effect the above desired result.

In the accompanying drawing, Figure 1 is a diagrammatic view, partly in section, of a train control equipment embodying my invention; and Fig. 2 is a development diagram, showing the different operating positions of the brake valve device shown in Fig. 1.

As shown in Fig. 1 of the drawing, the train control equipment comprises a brake valve device 1, a brake application valve device 2, an application control valve device 3, a main reservoir 4, an equalizing reservoir 5, a reduction limiting reservoir 6, a stop reservoir 7, a feed valve device 8 and a check valve device 9.

The brake valve device 1 is of the usual well known type having positions in which the brakes on a locomotive may be controlled directly by straight air, and other positions for automatically controlling the brakes on a train by varying the pressure of fluid in a brake pipe 10. The brake valve device comprises a casing having a chamber 11 containing a rotary valve 12, which is adapted to be operated by a handle 13 connected to said rotary valve through an operating stem 14. A poppet valve 15 is contained in a chamber 16 of said casing and is urged to a seat 17 by the pressure of a spring 18. The poppet valve 15 has a fluted stem 19 extending through a suitable opening in the casing and engaging a cam-like lug 20 carried by the rotary valve operating stem 14, said lug being adapted to unseat valve 15 in certain positions of the brake valve device, as will be hereinafter more fully explained.

The brake application valve device 2 comprises a casing having a piston chamber 21 containing an application piston 22 and a valve chamber 23 containing a slide valve 24 adapted to be operated by said piston. A spring 25 contained in piston chamber 21 acts on piston 22 to normally maintain said piston in the position shown in the drawing. Also contained in said casing is an equalizing discharge valve mechanism comprising a piston 26 and a brake pipe discharge valve 120 adapted to be operated by said piston, said piston having a chamber 27 at its upper side, which is connected through a passage and pipe 28 to the equalizing reservoir 5, and having a chamber 29 at its opposite or lower side, which chamber is in constant communication with the brake pipe 10 through a passage and pipe 30.

For governing the operation of the brake application valve device 2, the application control valve device 3 is provided and comprises a control valve portion, a suppression portion, a timing portion and a magnet valve device portion.

The control valve portion of the brake application valve device comprises a piston 31 contained in a chamber 32 and a slide valve 33 contained in a chamber 34 and adapted to be operated by said piston. A spring 81 contained in piston chamber 32 is adapted to maintain said piston and slide valve in their normal position, as shown in the drawing.

The suppression portion of the brake application valve device 3 comprises a flexible diaphragm 36, subject on one side to the pressure in a chamber 37 and subject on the opposite side to the pressure of a spring 38 acting through a follower member 39. Said follower member has a fluted stem 40 extending to the left, which is adapted to engage the fluted stem 41 of a double beat valve 42 upon movement of said follower member by said diaphragm 36. For seating said valve in the position shown in the drawing, a spring 43 is provided, which acts on the fluted stem 44 of said valve.

The timing valve portion of the brake application valve device 3 comprises a valve piston 45 subject on one side to the pressure in a chamber 46 and on the opposite side to the pressure of a spring 47. Operatively mounted in a suitable bore in a partition wall 48 in said valve piston is a plunger-like stem 49, which projects upwardly and is adapted to engage the fluted stem 50 of a double beat valve 51. Interposed between an enlarged head portion 52 of the stem 49 and the lower wall of valve piston 45 is a spring 53, which is adapted to urge the double beat valve 51 to its upper seat, as shown in the drawing, when the valve piston 45 is shifted upwardly. The double beat valve 51 has an upwardly extending fluted stem 54 which is engaged by a spring pressed plunger member 55 for seating said valve in its lower position.

The magnet valve device portion comprises a magnet 56 and two valves 57 and 58 adapted to be operated to the position shown in the drawing, when said magnet is energized. Upon deenergization of said magnet, both valves 57 and 58 are adapted to be shifted to their upper position by a spring 59.

The magnet 56 is adapted to be controlled by the track condition in such a manner that if the track conditions are favorable, the magnet will be energized, but if for any reason the track conditions become unfavorable, then the magnet will be deenergized.

The check valve device 9 comprises a casing having a chamber 60 containing a ball check valve 61, which is adapted to permit flow of fluid under pressure from a passage 62 to a passage 63, but to prevent flow of fluid under pressure in the reverse direction.

In operation, to initially charge the equipment with fluid under pressure, the brake valve rotary valve 12 is turned to lap position by operating the handle 13, and assuming the track condition to be favorable, the magnet 56 is energized.

Fluid under pressure is supplied to the main reservoir 4 by an air compressor in the usual manner and from the main reservoir flows to the feed valve device 8, which reduces the pressure to that employed in controlling the brakes and in the operation of the train control apparatus. Fluid at this reduced pressure then flows through pipe and passage 64 to the control valve chamber 34 and magnet valve chamber 65 in the application control valve device 3, and to valve chamber 23 of the brake application valve device 2.

The magnet 56 being energized, the magnet valve 57 is seated and the magnet valve 58 is unseated, so that fluid under pressure is permitted to flow from the magnet valve chamber 65, past the valve 58, through passage 66, past a ball check valve 67 and through a choked passage 68 around said check valve to a chamber 69 and from thence through a passage 70 to piston chamber 46 at the lower side of the timing valve piston 45. When the pressure in the chamber 69 and the valve piston chamber 46 is thus built up to a predetermined degree, the downwardly acting pressure of spring 47 on the valve piston 45 is overcome and said piston is shifted upwardly, effecting a seal against a gasket 71, as shown in the drawing.

The upward movement of valve piston 45 shifts the double beat valve 51 to its upper seated position, in which, chamber 72 containing said valve is connected to the atmosphere past the fluted valve stem 50 and through an atmospheric passage 73, and communication between chambers 72 and 74 is cut off.

As hereinbefore described, fluid at the pressure supplied by the feed valve device 8 is supplied to the control valve chamber 34. Since in initially charging the equipment the piston chamber 32 is at atmospheric pressure, the pressure of fluid supplied to the valve chamber 34 and acting on the piston 31 shifts said piston and the slide valve 33 upwardly into engagement with a gasket 75, in which position a cavity 85 in said slide valve connects passage 77 from the face of the piston 31 to passage 86 leading to the release poppet valve chamber 16 in the brake valve device, the poppet valve 15 being seated when the brake valve device is in lap position.

Fluid under pressure flows from the control valve chamber 34 through a port 76 in the piston 31 to piston chamber 32 and from thence through passages 77 and 86 to the release poppet valve chamber 16 in the brake valve device in the manner above described, and also from passage 77 to chamber 78. The double beat valve 42 is initially seated in the position shown in the drawing, by the pressure of spring 43, since the pressure of spring 38 holds the follower 39 to the right on account of the diaphragm chamber 37 being at atmospheric pressure, when initially charging the equipment. Fluid under pressure is thus permitted to flow from chamber 78 to chamber 79 and from thence through passage 80 to chamber 74, which is closed by the double beat valve 51. Since the fluid under pressure flowing into the piston chamber 32 thus is not permitted to flow to the atmosphere, a pressure is built up, and when said pressure becomes substantially equal to the pressure in valve chamber 34, the piston 31 and valve 33 are shifted downwardly to their normal position, as shown in the drawing, by the pressure of spring 81.

In this position, communication between passage 77 and passage 86, connected to the brake valve device, is cut off and the fluid under pressure in the control piston chamber 32 and chamber 74 of the timing valve portion is thus bottled up.

After the control piston 31 and slide valve 33 are thus shifted downwardly to their normal position, the brake valve rotary valve 12 may be turned to the release position as shown in Fig. 1 of the drawing, in which position the release poppet valve 15 is unseated, thereby connecting passage 86 to the atmosphere. The stop reservoir 7 is connected to passage 86 through pipe and passage 87, passage 62, past ball check valve 61 and through passage 63, so that said reservoir is also normally at atmospheric pressure.

With the brake valve device in release position and the control piston 31 and valve 33 in release position, as shown in the drawing, the suppression diaphragm chamber 37 is connected to the atmosphere through passage 88, cavity 89 in the slide valve 33, passage and pipe 90, cavity 91 in the rotary valve 12 and an atmospheric passage 92. Passage 93 from the brake application valve piston chamber 21 is also normally lapped by the control slide valve 33, so that fluid under pressure is permitted to flow from the application valve chamber 23 through a port 94 in the application piston 22 to piston chamber 21 and therein build up a pressure. The fluid under pressure in valve chamber 23 may initially shift the application piston 22 and slide valve 24 to the right against a gasket 95, but when the fluid pressure becomes substantially equal on the opposite sides of said piston, the pressure of spring 25 urges said piston and the slide valve 24 to their normal release position, as shown in the drawing.

With the application slide valve 24 in the release position, a passage 96 is uncovered through which fluid under pressure is permitted to flow from the valve chamber 23 to the rotary valve chamber 11 of the brake valve device. With the brake valve device in release position, fluid under pressure is then permitted to flow from the rotary valve chamber 11 through a port 97 in the rotary valve 12 to passage and pipe 30 and from thence to brake pipe 10 and equalizing piston chamber 29, thereby charging said brake pipe and piston chamber. Fluid under pressure also flows from the rotary valve chamber 11 through a port 98 in the rotary valve and a passage 99 to a chamber 100 and from thence through passage and pipe 101 to the seat of the application slide valve 24. With the slide valve 24 in release position, passage 101 is connected to a passage 102 through a cavity 103 in said slide valve, so the fluid under pressure is permitted to flow from passage 101 to passage 102 and to equalizing piston chamber 27 and from thence through passage and pipe 28 to the equalizing reservoir 5. The pressure of the fluid on the opposite sides of the equalizing piston thus builds up at substantially the same time and to the same degree, thereby permitting said piston to maintain the brake pipe discharge valve 120 seated, in the usual well known manner.

With the brake valve device in release position the reduction reservoir 6 is connected to the atmosphere through pipe and passage 104, cavity 91 in the brake valve rotary valve 12 and the atmospheric passage 92.

With the brakes released and the equipment charged with fluid under pressure as above described, if the track conditions become unfavorable, the magnet 56 is deenergized, thereby permitting spring 59 to seat valve 58, so as to cut off the supply of fluid under pressure from the feed valve device 8 through pipe and passage 64, and to unseat valve 57.

With valve 57 unseated, the fluid under pressure acting on the timing valve piston 45 in chamber 46 and in chamber 69 is permitted to gradually flow to the atmosphere through the choked passage 68, passage 66, past magnet valve 57 and through a passage 105. When the pressure in valve piston chamber 46 is thus reduced to a degree slightly less than the pressure of spring 47 acting on the opposite side of said valve piston, the valve piston is shifted downwardly into engagement with a gasket 106, thus permitting the spring pressed plunger 55 to shift the double beat valve 51 to its downward position, in which chambers 74 and 72 are connected. Fluid under pressure is thus permitted to flow from the control piston chamber 32 through passage 77 to chamber 78, then past the fluted valve stem 44 to valve chamber 79, through passage 80 to valve chamber 74, past the fluted valve stem 54 to chamber 72 and from thence through passage and pipe 87 to the stop reservoir 7 which is normally connected to the atmosphere by way of ball check valve 61, passage and pipe 86 and the unseated release poppet valve 15.

The fluid under pressure is thus vented from the control piston chamber 32 to the atmosphere, which permits the pressure of fluid in the valve chamber 34 to shift the piston 31 and slide valve 33 to their upper position, in which the brake application valve piston chamber 21 is connected to the atmosphere through passage and pipe 93, a cavity 107 in the slide valve 33 and an atmospheric passage 108.

With the fluid under pressure thus vented from the application piston chamber 21, the pressure of fluid in the valve chamber 23 acts to shift the piston 22 and slide valve 24 to the right or application position against a gasket 109.

With the application slide valve 24 in application position, the cavity 103 in said slide valve connects passage 102 from the equalizing piston chamber 27 and equalizing reservoir 5 to passage 104 leading to the reduction reservoir 6. As hereinbefore described, the reduction reservoir 6 is normally vented to the atmosphere, so that fluid under pressure thus flows from the equalizing piston chamber 27 and equalizing reservoir 5 to the reduction reservoir 6, thereby reducing the pressure acting on the upper face of the equalizing piston 26. The fluid at brake pipe pressure acting in chamber 29 at the lower side of said piston then shifts the equalizing piston 26 upwardly against the reducing pressure in chamber 27. This upward movement of piston 26 opens the brake pipe discharge valve 120, which permits fluid under pressure to be vented from the brake pipe 10 to the atmosphere by way of pipe and passage 30, equalizing piston chamber 29, past the discharge valve 120 and through a restricted atmospheric passage 110. The brake pipe pressure being thus reduced causes the brakes to be applied, in the usual well known manner.

As hereinbefore described, when the brake valve device is in release position, the reduction reservoir 6 is connected to the atmosphere, so that when an automatic application of the brakes is effected as just described, the fluid under pressure vented from equalizing reservoir 5 to the reduction reservoir 6 flows to the atmosphere, thereby permitting the equalizing reservoir pressure to reduce to atmospheric pressure and the brake pipe pressure to reduce a corresponding degree. This is unnecessary to obtain a full service application of the brakes, and in order to limit the degree of reduction in equalizing reservoir pressure and consequently in brake pipe pressure to that necessary to effect a full service application of the brakes, the brake valve rotary valve 12 is turned to automatic lap position after the magnet 56 is deenergized.

In automatic lap position of the brake valve device, passage 104 from the reduction reservoir 6 is lapped by the rotary valve 12 in the brake valve device, so as to limit the degree of reduction in pressure in the equalizing reservoir 5 and equalizing piston chamber 27 to equalization into the reduction reservoir 6. When the brake pipe pressure in the equalizing piston chamber 29 then reduces to a degree slightly less than the reduced equalizing reservoir pressure in equalizing piston chamber 27, then the equalizing piston is operated to seat the brake pipe discharge valve 120, so as to prevent further reduction in the brake pipe pressure.

When the brake valve device is turned to automatic lap position upon the initiation of a train control application of the brakes, the release poppet valve 15 is seated, thereby closing the atmospheric connection of passage 86. As a result, the fluid under pressure vented from the control piston chamber 32 and through port 76 in the control piston only flows to the stop reservoir 7 by way of passage 77, past double beat valve 42, through passage 80, past double beat valve 51 and through passage and pipe 87 as hereinbefore described, and when the pressure in said reservoir becomes substantially equal to the pressure in the control valve chamber 34, then the pressure of spring 81 shifts the control piston 31 and slide valve 33 back to the normal position as shown in the drawing. In this position of the control slide valve, passage 93 from the brake application piston chamber 21 is again lapped, so that said chamber becomes recharged in the manner hereinbefore described, thereby permitting the spring 25 to shift the piston 22 and slide valve 24 back to release position. The stop reservoir however is of such volume as to cause the control piston 31 to remain in application position a degree of time sufficient to permit a full service application of the brakes to be effected by the operation of the brake application valve device 2, in the manner hereinbefore described.

If the track conditions become favorable, the magnet 56 is energized, thereby operating to supply fluid under pressure to the valve piston chamber 46 and chamber 69. The valve piston 45 is then operated to seat double beat valve 51 in its upper position, in which position communication between the control piston chamber 32 and stop reservoir 7 is cut off. The brake valve device is then turned to release position in which fluid under pressure is vented from the stop reservoir 7 to the atmosphere, and the brake pipe and equalizing reservoir are recharged with fluid under pressure in the same manner as in initially charging the equipment, as hereinbefore described. The brake pipe being recharged, the brakes then release in the usual manner.

Since after the brakes are fully applied, the control piston 31 and slide valve 33 are returned to their normal position and consequently the brake application valve piston 22 and slide valve 24 return to their normal position as hereinbefore described, the release of the brakes is hastened upon the energization of the magnet 56, when the track conditions become favorable.

When the track conditions become unfavorable, the brakes must be applied, and if for any reason the operator desires to prevent the train control apparatus from operating to effect an application of the brakes as hereinbefore described, then he turns the brake valve rotary valve 12 to automatic service position after the magnet 56 becomes deenergized. In this service position, passage 90 is connected to passage 94 through the rotary valve chamber 11. Passage 94 being connected to the fluid pressure supply by way of the brake application valve chamber 23, fluid under pressure flows from said valve chamber through passage 94, rotary valve chamber 11 and passage 90 to the seat of the control slide valve 33 and from thence through cavity 89 in said slide valve and passage 88 to the suppression diaphragm chamber 37, wherein said pressure acts on diaphragm 36, deflecting said diaphragm which seats double beat valve 42 to the left, in which position communication between chambers 78 and 79 is cut off and fluid under pressure in the chamber 78 and the connected control piston chamber 32 is bottled up. Then, when the timing valve piston 45 is operated against the reduced pressure in chambers 46 and 69, as effected upon the de-energization of magnet 56, and the double beat valve 51 is shifted to its downward position, the control piston 31 and slide valve 33 do not operate to automatically effect an application of the brakes in the manner hereinbefore described.

It is thus evident that an operator may suppress or prevent a train control application of the brakes from being effected, but in order to obtain such suppression, the brake valve device must be turned to the automatic service position, before the control piston 31 operates to shift the slide valve 33 to its upper or application position, in the manner hereinbefore described. This is necessary since communication from the brake valve device to the suppression diaphragm chamber 37 is controlled through cavity 89 in the control slide valve and if said slide valve moves to application position before the brake valve device is operated, then it becomes impossible to supply fluid under pressure to the suppression diaphragm chamber 37 to operate the double beat valve 42.

When the operator turns the brake valve device to automatic service position, in addition to preventing the train control apparatus from functioning, he causes the brakes to be applied in the usual well known manner. In service position of the brake valve device, passage 99 is connected to passage 104, so that fluid under pressure is permitted to flow from the equalizing piston chamber 27 and the connected equalizing reservoir 5 through passage 102, cavity 103 in the brake application valve slide valve 24, passage and pipe 101, chamber 100 in the brake valve device and passage 99 to passage 104 leading to the reduction reservoir 6. The fluid pressure in said equalizing piston chamber and reservoir is thus permitted to equalize into the reduction reservoir 6, the usual atmospheric connection of said reservoir through passage 104, cavity 91 in rotary valve 12 and passage 92 being cut off in service position of the brake valve device. This reduction in the fluid pressure on the upper side of the equalizing piston 26, permits the higher brake pipe pressure acting on the lower side of the equalizing piston, to operate said piston to open the brake pipe discharge valve 120 and effect a brake pipe reduction substantially equal to the reduction in equalizing reservoir pressure, in the same manner as when a train control application of the brakes is effected.

If the operator suppresses the train control apparatus from functioning, it is necessary that he leave the brake valve device in service position, in which a full service application of the brakes is effected. If only a partial service application is effected and the brake valve device is then moved to lap position to prevent any further brake application, then the passage 90, through which fluid under pressure is supplied to the suppression diaphragm chamber 37, is connected to the atmospheric passage 92 in the brake valve device. The fluid under pressure is thus vented from the suppression diaphragm chamber, which permits spring 43 to shift double beat valve 42 to its right hand seat, in which position the control piston chamber 32 is vented to the atmosphere in the same manner as when a train control application of the brakes is effected, it being understood that the magnet 56 is deenergized due to unfavorable track conditions, and consequently that double beat valve 51 is seated in its lower position, as hereinbefore described.

When the track conditions become favorable again, the magnet 56 is energized, causing the timing valve portion to operate to seat double beat valve 51 in its upper position, after which the brake valve device may be turned to release position in which the brake pipe and equalizing reservoir are recharged in the same manner as in initially charging the equipment, and as the brake pipe pressure is increased the brakes are released in the usual well known manner.

While one illustrative embodiment of the invention has been described in detail, it is not the intention to limit its scope to that embodiment or otherwise than by the terms of the appended claims.

Having now described the invention, what is claimed as new and desired to secure by Letters Patent, is:

1. In a train control equipment, the combination with a brake pipe, of a valve device operative to effect a reduction in brake pipe pressure to apply the brakes on a train, means operative upon a change in the signal indication for effecting the operation of said valve device, and a brake valve device operative in one position to prevent the operation of said signal controlled valve device and to effect a predetermined reduction in brake pipe pressure.

2. In a train control equipment, the combination with a brake pipe, of a valve device operative to effect a reduction in brake pipe pressure to apply the brakes on a train, means operative upon a change in signal indication for effecting the operation of said valve device, a brake valve device operative in service position to suppress the operation of said signal controlled valve device and to effect a reduction in brake pipe pressure, and means associated with said brake valve device for limiting the degree of brake pipe reduction to a predetermined amount.

3. In a train control equipment, the combination with a brake pipe, of a valve device operative to effect a reduction in brake pipe pressure to apply the brakes on a train, means operative upon a change in signal indication for effecting the operation of said valve device, a brake valve device, means operative in one position of said brake valve device for limiting the reduction in brake pipe pressure effected by the operation of said signal controlled valve device to a predetermined amount, said brake valve device being operative in another position to prevent the operation of said signal controlled valve device and to effect a predetermined reduction in brake pipe pressure.

4. In a fluid pressure brake, the combination with an equalizing reservoir and a reduction reservoir, of a brake pipe, an equalizing discharge valve mechanism operative upon a reduction in equalizing reservoir pressure to vent fluid under pressure from said brake pipe to the atmosphere to effect an application of the brakes, a valve device operative to connect said reservoirs to effect a predetermined reduction in equalizing reservoir pressure, means operative upon a change in signal indication for effecting the operation of said valve device, and a brake valve device operative to prevent the operation of said signal controlled valve device and to connect said reservoirs to effect a predetermined reduction in equalizing reservoir pressure.

5. In a fluid pressure brake, the combination with an equalizing reservoir and a reduction reservoir, of a brake pipe, an equalizing discharge valve mechanism operative upon a reduction in equalizing reservoir pressure to vent fluid under pressure from said brake pipe to the atmosphere to effect an application of the brakes, a valve device operative to connect said reservoirs to effect a full service reduction in equalizing reservoir pressure, means operative upon a change in signal indication for effecting the operation of said valve device, a suppression valve for preventing the operation of said valve device, and a brake valve device having a service position for operating said suppression valve and for connecting said reservoirs to effect a full service reduction in equalizing reservoir pressure, and a lap position in which said suppression valve is inoperative to prevent the operation of said valve device.

6. In a train control apparatus, the combination with a brake pipe, of a valve device operative to effect a reduction in brake pipe pressure, means operative upon a change in signal indication for effecting the operation of said valve device, suppression means operative upon a predetermined reduction in brake pipe pressure for preventing the operation of said signal controlled valve device, a brake valve device for controlling said suppression means, and means operative in one position of said brake valve device for effecting said predetermined reduction in brake pipe pressure.

7. In a train control equipment, the combination with a brake pipe, of a valve device operative to effect a reduction in brake pipe pressure to apply the brakes on a train, means operative upon a change in signal indication for effecting the operation of said valve device, and a brake valve device operative in service position to prevent the operation of said signal controlled valve device, provided the brake valve device remains in service position and a predetermined reduction in brake pipe pressure is effected.

In testimony whereof we have hereunto set our hands, this 6th day of August, 1929.

MABLE M. THOMAS,
*Executrix of the Last Will and Testament of Thomas H. Thomas, deceased.*
JOHN N. GOOD.